United States Patent [19]
Puidak

[11] 3,848,183
[45] Nov. 12, 1974

[54] EDDY CURRENT TESTING SYSTEM HAVING CONCENTRIC COILS, ONE BEING MOVABLE FOR BALANCING

[75] Inventor: Heino Puidak, Hoffman Estates, Ill.

[73] Assignee: Magnaflux Corporation, Chicago, Ill.

[22] Filed: Apr. 20, 1973

[21] Appl. No.: 352,916

[52] U.S. Cl. ................................ 324/40, 336/129
[51] Int. Cl. ............................................ G01r 33/12
[58] Field of Search ............... 324/34 R, 37, 40, 41; 336/129, 170, 211

[56] References Cited
UNITED STATES PATENTS

| | | | |
|---|---|---|---|
| 2,237,254 | 4/1941 | Broekhuysen | 324/41 |
| 2,555,853 | 6/1951 | Irwin | 324/34 R |
| 2,957,129 | 10/1960 | Irwin | 324/40 |
| 3,366,873 | 1/1968 | Miller et al. | 324/40 |

*Primary Examiner*—Robert J. Corcoran
*Attorney, Agent, or Firm*—Brezina & Lund

[57] ABSTRACT

Eddy current testing system in which a test coil unit includes a pair of windings arranged to develop substantially equal voltages with no specimen in the unit and to develop unequal voltages with a specimen in the unit, corresponding to characteristics of the specimen. The pair of windings are preferably disposed one inside the other and are preferably excited from a primary winding disposed between the pair of windings which are connected in series opposed relation to the input of an amplifier. A coil form structure is provided which permits adjustment of the relative position of the windings to obtain a nearly exact balance over a wide range of frequencies.

4 Claims, 4 Drawing Figures

3,848,183

EDDY CURRENT TESTING SYSTEM HAVING CONCENTRIC COILS, ONE BEING MOVABLE FOR BALANCING

This invention relates to an eddy current testing system and more particularly to a system including a test coil which is self-balancing and operative over a wide range of frequencies with a high degree of reliability, while being comparatively simple in construction and operation and economically manufacturable.

BACKGROUND OF THE PRIOR ART

In one type of eddy current testing system, a test coil unit and a specimen, such as a metal part, are placed in inductive relation, usually with the specimen inside the test coil unit. Heretofore, in this type of system, a balancing network has generally been provided with signals from the test coil unit and the balancing network being applied to a detector circuit, and with amplitude and phase controls of the balancing network being adjusted in a manner such that the signals from the coil unit and network balance out when there is no specimen in inductive relation to the coil unit. Then, when a specimen is placed in the coil unit, the detector unit develops an output signal corresponding to the characteristics of the specimen. The use of the balancing network is satisfactory in some cases, but the adjustment thereof must be carefully performed and is time-consuming, and it changes with variations in temperature and other operating conditions, so that frequent readjustment may be necessary. In many cases, the user does not have the time or ability to make the proper balancing adjustments, oftentimes resulting in inaccuracies in measurements.

Another problem is that the balance, even when carefully performed, is good only for a quite narrow frequency range and in many applications, it is desirable to test at different frequencies. In such cases, a balance adjustment at each frequency may be necessary.

There are a number of other types of eddy current testing systems such as systems in which a specimen of unknown character is compared with one of known character and systems in which two different portions of the same specimen are compared. For example, systems have been provided using a single primary coil and a pair of differentially connected axially spaced secondary coils for testing pipe. Such other types of systems and the test coil arrangements thereof are not, however, suitable for use in the first-mentioned type of testing operation.

SUMMARY OF THE INVENTION

This invention was evolved with the general object of overcoming the disadvantages of prior art systems and of providing a system in which balancing is accurately and reliably obtained over a wide frequency range.

A more specific object of the invention is to provide a test coil unit which is self-balancing and operative over a wide frequency range while being readily and economically manufacturable.

In accordance with the invention, a test coil unit is provided which is arranged to receive a specimen therein and which includes a pair of windings arranged to develop substantially equal voltages thereacross with no specimen in the unit and to develop unequal voltages thereacross with a specimen disposed in the unit. The difference between such voltages is measured to determine the characteristics of the specimen. For example, in the case of a specimen of steel, the magnitude and phase of the difference between the voltage is a function of conductivity, permeability, hardness, alloy or grade of steel, mass of the specimen, test frequency and the driving power of the test coil unit.

Preferably, and in accordance with a specific feature of the invention, one of the windings is disposed inside the other so as to be closer to a specimen in the unit. The specimen thereby causes a larger impedance change in the inner winding than in the outer winding, when disposed in the unit.

In accordance with another feature, the pair of windings are energized by means of a primary winding coupled to an energizing source and preferably disposed between the pair of windings which thereby form secondary windings operative to develop voltages by transformer action.

The windings may be of rectangular, elliptical or other shapes but are preferably circular in shape and concentric about a common axis.

Additional features relate to a coil form arrangement for supporting the windings. In particular, three forms may be provided, each of annular form and each having an annular slot in the outside thereof for receiving a winding. The forms are fitted one within another and means are provided for permitting adjustment of the exact relative position thereof to obtain an accurate balance and to fix the forms in position once adjusted, so as to obtain a permanent accurate balance.

This invention contemplates other objects, features and advantages which will become more fully apparent from the following detailed description taken in conjunction with the accompanying drawing.

DESCRIPTION OF A PREFERRED EMBODIMENT

Figure 1:
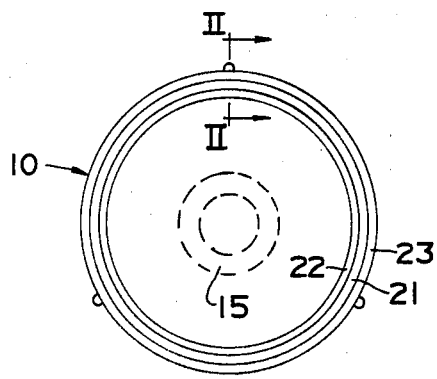
FIG. 1 is an end elevational view of a test coil unit according to the invention.
Figure 2:
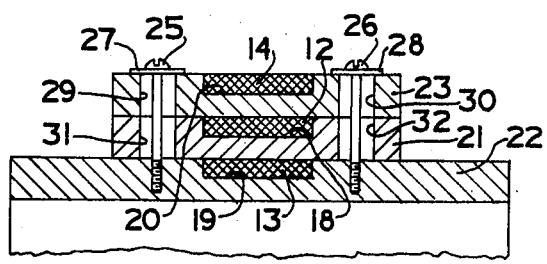
FIG. 2 is a sectional view, on an enlarged scale, taken substantially along line II—II of FIG. 1.

Reference numeral 10 generally designates a test coil unit constructed in accordance with the principles of the invention. The unit 10 comprises a coil form structure 11 which supports a primary winding 12 and secondary windings 13 and 14 and which is arranged to receive a specimen therein, such as a part 15 as indicated in broken lines.

The windings 12–14 are so constructed and arranged that with a varying voltage applied to the primary winding 12 and with no specimen in the unit, the voltages across the secondary windings 13 and 14 are substantially equal while with a specimen disposed in the unit, such as the specimen 15 indicated in broken lines, the voltages across the secondary windings 13 and 14 are unequal, the difference between such voltages providing an indication of the characteristics of the specimen.

In the illustrated arrangement, the secondary winding 13 is disposed inside the secondary winding 14 so as to be closer to a specimen being tested which thereby causes a larger impedance change in the inner winding 13 than in the outer winding 14. With windings 13 and 14 being energized by inductive coupling to the primary winding 12, the specimen being tested also causes unequal changes in the effective coupling coefficient between the windings 13 and 14 and the primary winding 12. As a result, the voltages developed across the windings 13 and 14 are unequal when a specimen is disposed in the unit, the magnitude and phase of the difference between such voltages being a function of characteristics of the specimen. In the case of a specimen of a steel material, for example, the magnitude and phase of the difference between such voltages is a function of conductivity, permeability, hardness, alloy or grade of steel, mass of the specimen and the frequency and power applied to the unit.

Preferably, the primary winding 12 is disposed approximately mid-way between the windings 13 and 14, the windings 12–14 are in alignment and the windings 13 and 14 have approximately the same axial and radial dimensions, with the wire sizes and number of turns being approximately the same. Also, the radial dimensions and spacings between the windings are a small fraction of the distance to the central axis of the unit. These features facilitate balancing. Also, the difference between the voltages developed across the windings 13 and 14 is controlled primarily by the characteristics of the specimen and the effect of variations in the exact positioning of the specimen in the unit is minimized.

The windings 12, 13 and 14 are respectively disposed in annular slots 18, 19 and 20 in the outside of members 21, 22 and 23 of insulating material, the member 21 being fitted on the outside of member 22 and inside the member 23. To hold the members 21–23 together, a pair of holding screws 25 and 26 extend through washers 27 and 28, thence through slots 29 and 30 in member 23 and thence through slots 31 and 32 in member 21, the ends of the screws 25 and 26 being threaded into the member 22. Preferably, a plurality of sets of holding screws are provided in equi-angularly spaced relationship. For example, three sets may be provided with 120° spacings therebetween. The screws and washers may preferably be of insulating materials. The slots 29–32 are larger than the shank portions of the screws, being preferably elongated in an axial direction, for the purpose of permitting precise adjustment of the position of the windings relative to each other, to obtain as nearly as possible an exact balance between the voltages developed across the windings 13 and 14.

Figure 3:
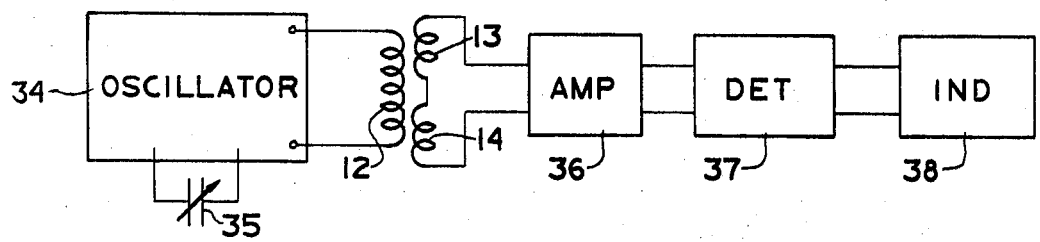
FIG. 3 is a circuit diagram showing the connection of windings of the test coil unit of FIGS. 1 and 2 in a measuring system.

FIG. 3 illustrates a circuit arrangement with which the test coil unit 10 is usable. An oscillator 34 is connected to the primary winding 12, the frequency of the oscillator being controllable by a variable capacitor 35. The secondary windings 13 and 14 are connected in series to the input of an amplifier 36 having an output connected to a detector circuit 37, the output of detector circuit 37 being applied to an indicator circuit 38. With no specimen in the test coil unit 10, the relative position of windings 12–14 may be adjusted to obtain, as nearly as possible, no output voltage from the detector circuit 37 while the frequency of oscillator 34 is varied over the desired range of operation, the holding screws being tightened when the relative positions of the windings are properly adjusted. Thereafter, the coil unit 10 will remain properly balanced, no separate balancing network being required. Variations in frequency, temperature and other variables affect both of the windings 13 and 14 to the same extent and balance out, the windings 13 and 14 being connected in series opposed relation. When a specimen is then disposed in the unit 10, it causes a larger impedance change in the inner secondary winding 13 and an increased effective coupling coefficient to the inner secondary winding 13. As a result, an output voltage is applied to the input of the amplifier 36 which is a function of the properties of the specimen.

With the test coil unit 10 constructed in the manner as shown and described, it is possible to obtain an accurate balance over a wide frequency range. By way of example, the test coil unit may be operated over a frequency range of from 100 Hz to 10 KHz. The output with a specimen in the unit will, however, change with frequency and the manner in which it changes with frequency provides additional information as to the characteristics of a specimen, not obtainable by testing at a single frequency.

Figure 4:
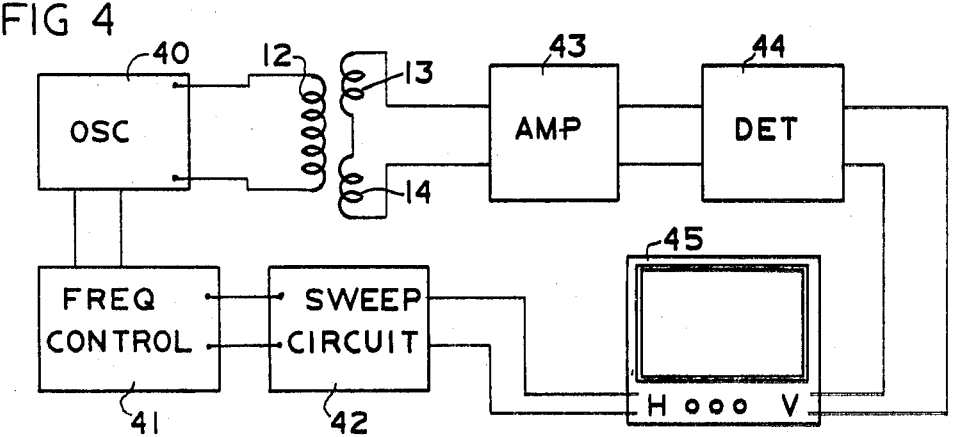
FIG. 4 is a circuit diagram showing the connection of windings of the test coil unit in another form of measuring system.

FIG. 4 shows a circuit for indicating response over a range of frequencies. The frequency of an oscillator 40, connected to the primary winding 12, is controlled by a frequency control circuit 41 which is connected to a sweep circuit 42, while a signal from the series-opposed secondary windings 13 and 14 is applied through an amplifier 43 to a detector circuit 44. The output of the detector circuit 44 is applied to the vertical input of an oscilloscope 45 while a sweep signal from the sweep circuit 42 is applied to the horizontal input of the oscilloscope 45. With this arrangement, a pattern is produced on the screen of the oscilloscope 45 in accordance with the characteristics of the specimen.

Both the circuit arrangement of FIG. 3 and that of FIG. 4 are especially advantageous for sorting operations, which may be performed with specimens moved through suitable conveying means through the test coil unit 10. After determining the response or pattern produced by a standard specimen, deviations can be readily detected by observation or automatically with suitable threshhold circuits.

It will be understood that modifications and variations may be effected without departing from the spirit and scope of the novel concepts of this invention.

I claim as my invention:

1. In an eddy current testing system for measuring characteristics of a specimen, a test coil unit arranged to receive the specimen therein, said test coil unit comprising coil form means including first, second and third annular forms each having an annular slot in the outside surface thereof, said forms being concentric and in radial alignment with said first form being fitted inside said third form and with said third form being fitted inside said second form, first and second windings in said annular slots of said first and second forms and having approximately the same axial and radial dimensions, wire sizes and members of turns, a third winding in said annular slot of said third form, an AC source connected to said third winding to develop AC voltages in said first and second windings, one of said first and second forms being adjustably positionable in an axial direction relative to the other to a position such as to equalize the instantaneous voltages developed in said first and second windings with no specimen disposed in said coil unit, and locking means for fixing said one of said forms in said position, and measuring means directly connected to said first and second windings to measure instantaneous differences in the voltages developed across said windings.

2. In a system as defined in claim 1, said measuring means including an amplifier having an input, and means connecting said first and second windings in series opposed relation to said amplifier input.

3. In a system as defined in claim 1, means for varying the frequency of said AC source over a predetermined range, said measuring means being arranged to indicate differences between the voltages developed across said first and second windings while said frequency is varied over said range.

4. In a system as defined in claim 1, the radial spacing between said first and second windings being a small fraction of the average radial distance to a central axis of said test coil unit.

* * * * *